United States Patent [19]

Henley et al.

[11] 3,993,530

[45] Nov. 23, 1976

[54] APPARATUS FOR APPLYING BELT STRIPS TO A TIRE CARCASS

[75] Inventors: Virgil E. Henley, Akron; Frank R. Jellison, Canton; Robert L. Brown, Akron, all of Ohio

[73] Assignee: The General Tire & Rubber Company, Akron, Ohio

[22] Filed: June 9, 1975

[21] Appl. No.: 585,263

Related U.S. Application Data

[63] Continuation-in-part of Ser. No. 406,984, Oct. 16, 1973, abandoned.

[52] U.S. Cl. ........................... 156/405; 156/128 R; 156/133; 156/128 N
[51] Int. Cl.² .................................... B29H 17/20
[58] Field of Search .......... 156/123 R, 128 I, 128 R, 156/129, 130, 133, 394 R, 397, 405, 406, 414

[56]   References Cited
       UNITED STATES PATENTS

| | | | |
|---|---|---|---|
| 1,255,073 | 1/1918 | Abbott | 156/405 |
| 1,276,436 | 8/1918 | Stevens | 156/405 |
| 2,002,970 | 5/1935 | Willshaw et al. | 156/405 |
| 2,343,954 | 3/1944 | Carlin | 156/405 |
| 3,017,312 | 1/1962 | Kraft | 156/406 |
| 3,162,562 | 12/1964 | Wenger et al. | 156/406 |
| 3,268,380 | 8/1966 | Guichon et al. | 156/130 |
| 3,647,126 | 3/1972 | Dieterich et al. | 156/405 |
| 3,795,563 | 3/1974 | Enders et al. | 156/406 |

*Primary Examiner*—William A. Powell
*Assistant Examiner*—John E. Kittle

[57]   ABSTRACT

A pneumatic tire building machine with a rotatable building drum and means for feeding to and positioning on a carcass band thereon, a circumferential belt or breaker strip. One or more belt strips are separately positioned adjacent the building drum and guide means separately guide the belt strips over the rotating drum in precision alignment relative to and preferably substantially symmetrically of the circumferential centerline of the drum. The belt strips are applied over the carcass band on the building drum at substantially the same velocity as the surface velocity of the rotating building drum and carcass band thereon.

10 Claims, 9 Drawing Figures

APPARATUS FOR APPLYING BELT STRIPS TO A TIRE CARCASS

CROSS REFERENCE TO RELATED APPLICATION

This application is a continuation-in-part of U.S. patent application Ser. No. 406,984, filed Oct. 16, 1973, now abandoned.

BACKGROUND OF THE INVENTION

This invention relates to an apparatus and method for building pneumatic tires and particularly for feeding belt strips to the building drum and positioning them over a laminated carcass band. Pneumatic tires and particularly bias type pneumatic tires have been generally built in a "flat band" and subsequently expanded to the toric shape in the curing mold. In building such tires, the belt assembly and tire tread are applied directly over a laminated carcass portion while in a flat band. Illustrative of the art generally is the equipment and methods described in U.S. Pat. Nos. 2,614,951, 2,614,952, 3,171,769, 3,156,601 and 3,645,826, which are owned by the assignee of the present invention.

Pneumatic tires of the radial type, on the other hand, have been commerically built by the "toric match" method where the tire carcass, built in a flat band, is expanded to a toric shape before applying the belt assembly and the tire tread. In this process, the tread and belt assemblies are separately built on a second rotatable building drum. Equipment for making radial tires by such methods is described and claimed in U.S. Pat. No. 3,475,254, which is owned by the assignee of the present invention.

Whether built in a flat band or by the toric match method, difficulty has been encountered in avoiding structural irregularities in the tire assembly that can adversely affect performance. For example, the belt assembly may vary substantially as to symmetry about the circumferential centerline of the tire building drum and the tire carcass. Moreover, the belt strips may stretch and distort as they are applied over the rotating carcass band. The resulting pneumatic tire may possess structural variations around its circumference that could impair certain of its performance characteristics.

The present invention substantially reduces such problems in the assembly of the belt or breaker strips and provides means by which the belt assembly can be precision aligned relative to the circumferential centerline of the building drum without stretching and distortion.

SUMMARY OF THE INVENTION

A pneumatic tire is built on a machine comprising at least one building drum typically rotatably mounted on a shaft. Building of the tire is commenced by first making the tire carcass by applying around a building drum a laminated band of rubberized plies.

Thereafter, a belt assembly is formed either on the building drum over the tire carcass or as a separate component on a separate building drum. In either event, the formation of the belt assembly is commenced by positioning at least one belt strip on a belt support means of a service apparatus adjacent a rotatable building drum. Belt guide means is then extended from a retracted position to an extended, applying position where the belt strip is applied over the building drum. The belt guide means has at least one belt guide roll for guiding the belt strip from the belt support means over the building drum in precision alignment relative to and preferably substantially symmetrically of the circumferential centerline of the building drum. Drive means is also provided for driving the belt guide roll at substantially the same surface velocity as the building drum during application of the belt strip so that the belt strip is concurrently applied over the building drum at substantially the same velocity as the surface velocity of the rotating building drum and in turn stretching and distorting of the belt assembly is substantially reduced.

Preferably two belt support means and two belt guide means are provided adjacent each other. The dual belt support and guide means are thus slidably mounted to move substantially axially of the building drum such that the belt support and guide means can be sequentially indexed for precision application of successive belt strips over the building drum from the belt support means.

Preferably, the drive means includes a first drive ring axially fastened to rotate with the belt guide roll and a second drive ring axially fastened to rotate with the building drum and engage said first drive ring at circumferential and preferably peripheral portions thereof. The first and second drive rings each have a ratio of diameters substantially equal to the ratio of diameters of the belt guide roll and building drum. By this arrangement, the first drive means can drive the belt guide roll at substantially the same surface velocity as the building drum during applications of the belt strips simply by rotation of the building drum. Further, it is preferred that the second drive ring be changeable to compensate for changes in diameter of the building drum with different sizes of tires or otherwise.

It is still further preferred that the belt guide means include at least two belt guide rolls interweaving the belt strip prior to application to the building drum. The belt guide rolls have a flat-bottomed groove substantially the width of the belt strip to provide guidance.

BRIEF DESCRIPTION OF THE DRAWINGS

In the accompanying drawings, the presently preferred embodiments and the presently preferred methods of practicing the invention are illustrated in which.

DESCRIPTION OF THE PREFERRED EMBODIMENTS

Figure 1:
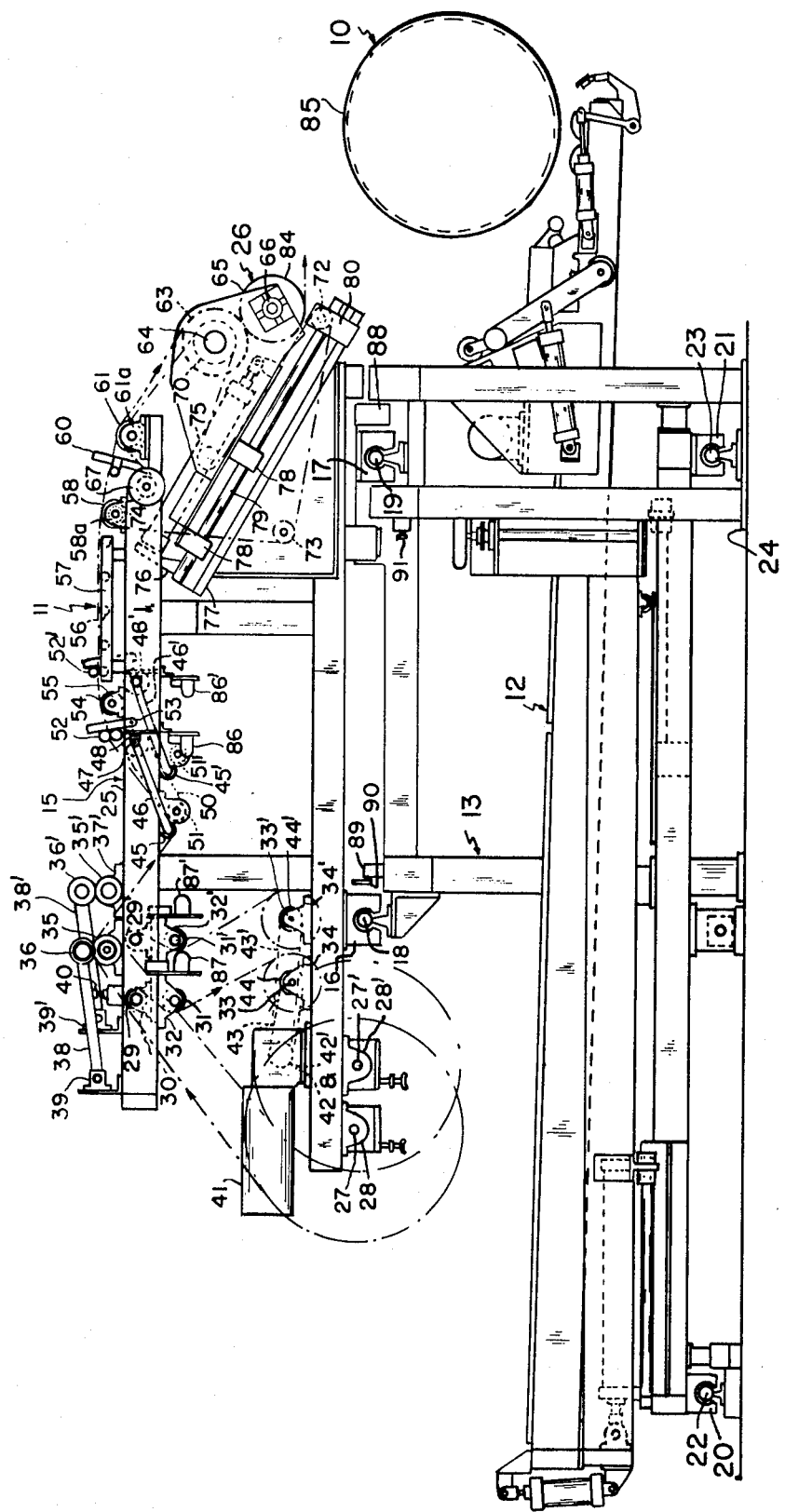
FIG. 1 is a side elevational view of the service apparatus for a pneumatic tire building machine showing the relation of the service apparatus to the building drum of the tire building machine.
Figure 2:
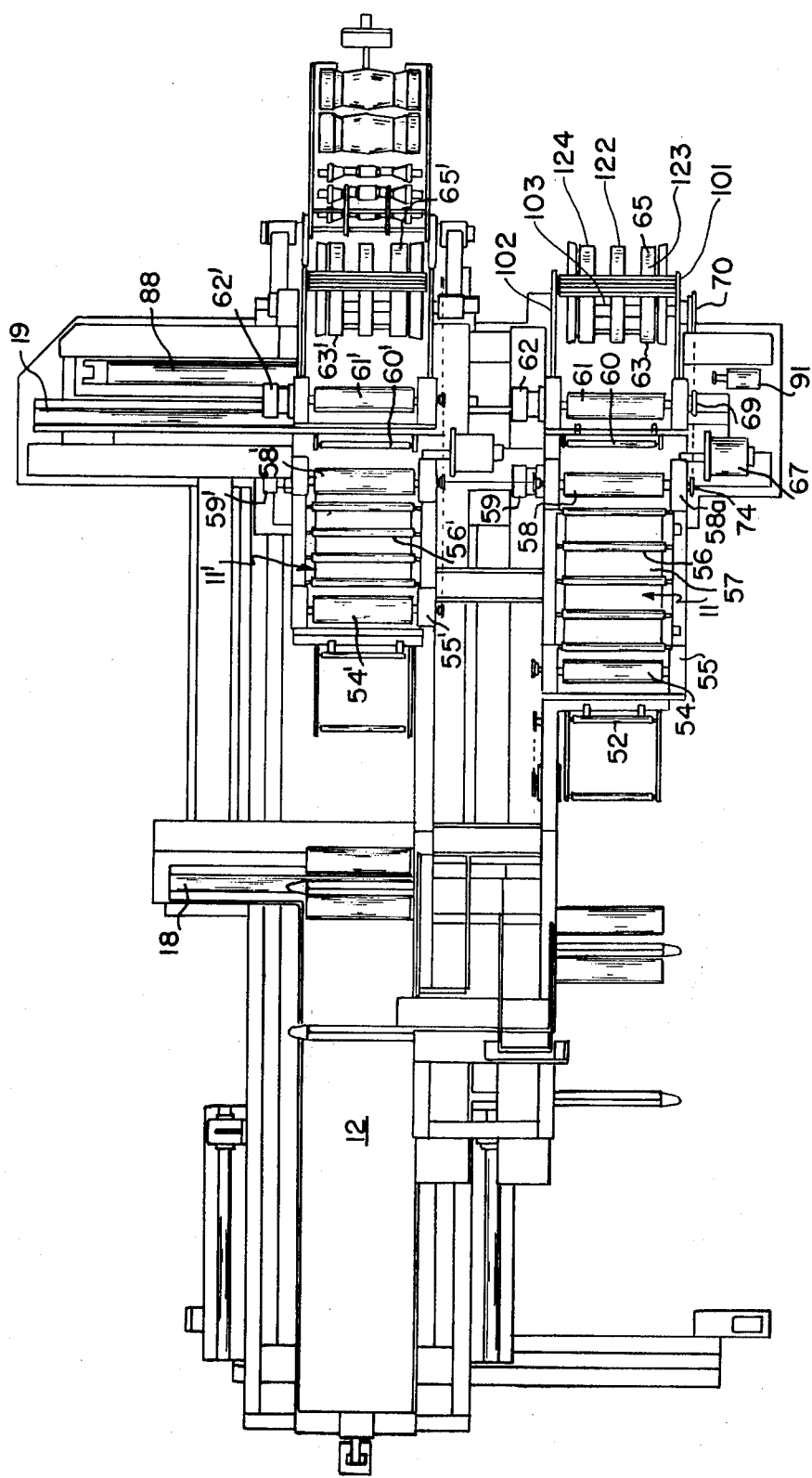
FIG. 2 is a top view of a service apparatus for a pneumatic tire building machine showing its relation to the building drum of the pneumatic tire building machine.
Figure 3:
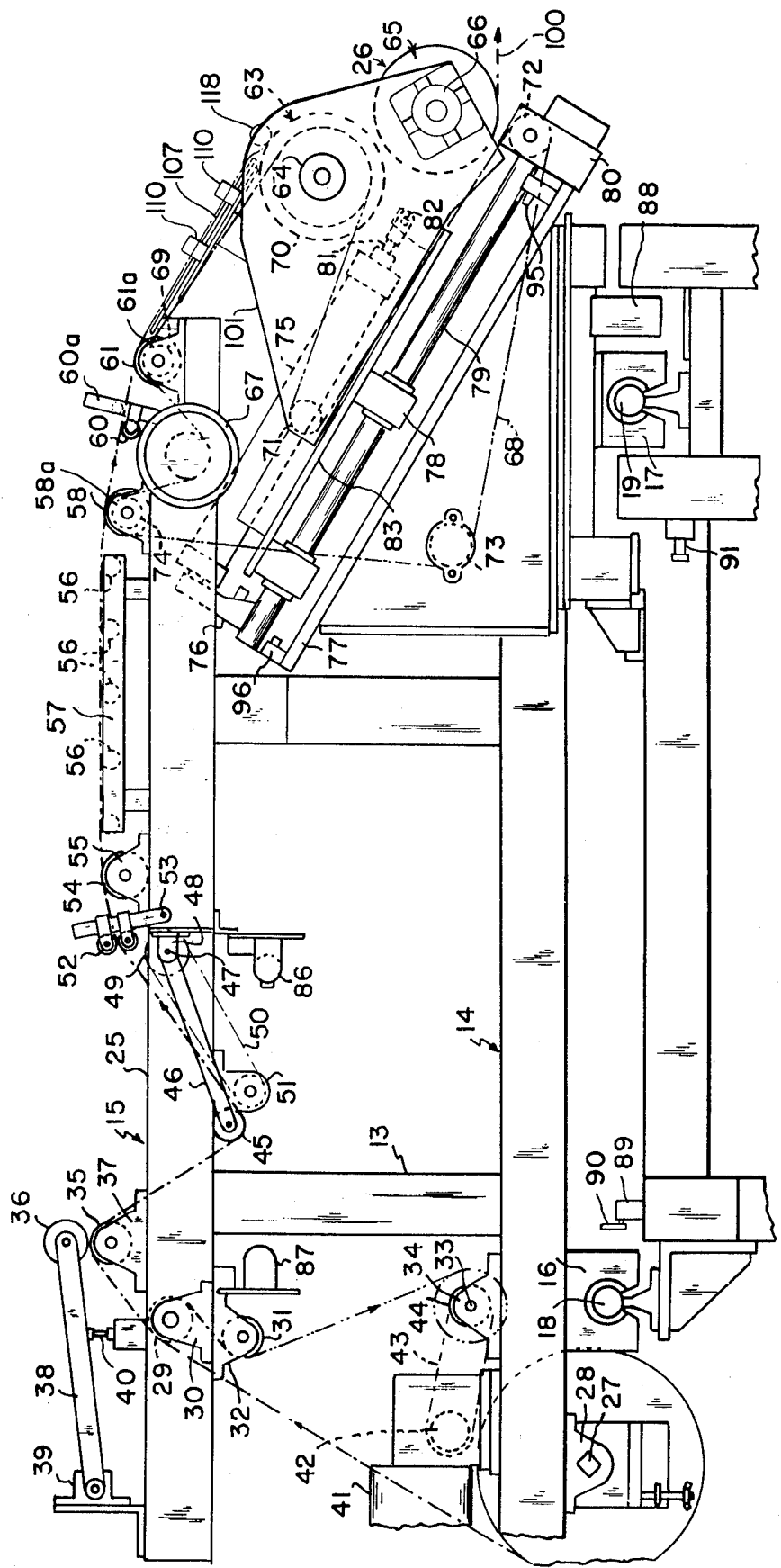
FIG. 3 is an enlarged side elevational view showing the belt applicator portion of the service apparatus shown in FIG. 1.
Figure 4:
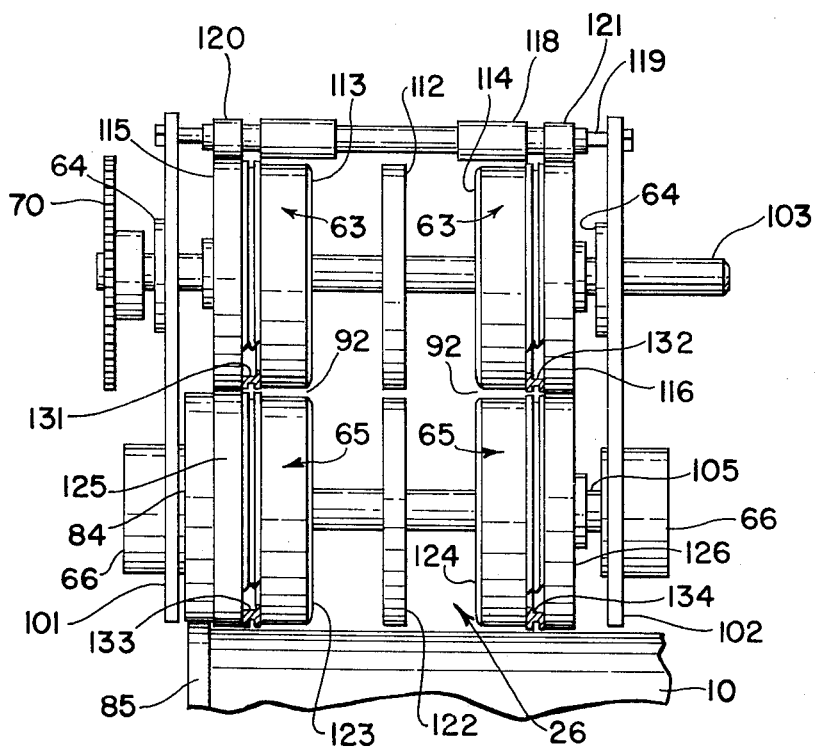
FIG. 4 is a fragmentary sectional view on an enlarged scale taken along line 4—4 of FIG. 3.
Figure 5:
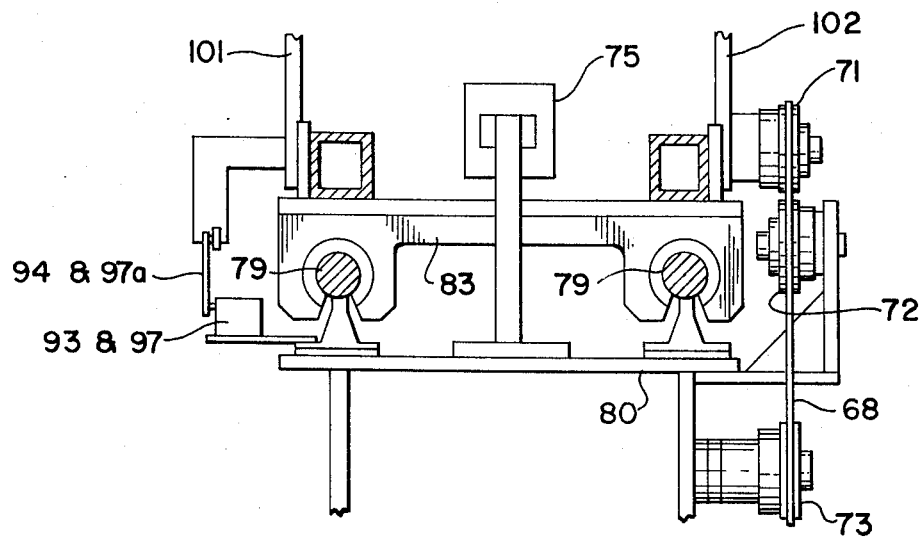
FIG. 5 is a fragmentary sectional view taken along the line 5—5 of FIG. 3.

The present service apparatus provides a means to automatically supply and precisely locate belt assemblies on a rotatable building drum without distorting or stretching the applied material. The apparatus is particularly applicable to making radial type pneumatic tires as described in U.S. Pat. No. 3,475,254, which is owned by the assignee of the present application. The present invention is an improvement on the tire building machine described in U.S. Pat. No. 3,475,254. This description by reference is, however, only for purposes of illustration and convenience. The invention may be otherwise variously embodied in making pneumatic tires either by the "flat band" or "toric match" methods.

Referring specifically to the Figures, a service apparatus embodying the present invention is positioned adjacent a rotatable building drum 10 of a pneumatic tire building machine. The service apparatus has two belt applicators 11 and 11' mounted side-by-side in elevation on a main frame 13, a middle frame 14 and an upper frame 15. The belt applicator 11 along with the frames 14 and 15 is slidably mounted to move axially of the building drum 10 by ball bushings 16 and 17 on parallel, spaced apart rails 18 and 19, respectively, which are in turn mounted on the main frame 13. Similarly, a tread applicator 12 is mounted to move axially of the building drum 10 by ball bushings 20 and 21 on parallel, spaced apart rails 22 and 23, respectively, which are in turn mounted on base 24 on which main frame 13 is also mounted.

Each belt applicator 11 comprises a belt support means or assembly 25 and a belt guide means or assembly 26. Prime symbols are assigned to the numerals for those parts of the belt support and guide means 25' and 26', which are substantially identical to parts of the belt support and guide means 25 and 26. The details of the support and guide means will be described with respect to support and guide means 25 and 26 with the understanding that the description applies also to the support and guide means 25' and 26'.

Each belt support means 25 includes a let-off shaft 27 rotatably mounted by bearing means 28 to the middle frame 14. On the let-off shaft 27 the belt stock or strip is supported in roll form with a liner strip between each layer. The belt strip with the liner is reeved over pull roll 29, rotatably mounted by bearing means 20 to upper frame 15, where the belt strip and the liner are separated. The liner falls away over a tension roll 31 rotatably mounted on a bearing means 32 to the upper frame 15 and is rewound on a supply shaft 33 rotatably mounted by bearing means 34 to the middle frame 14.

The belt strip proceeds upwardly between a second pull roll 35 and a pressure roll 36. The pull roll 35 is rotatably mounted by a bearing means 37 to the upper frame 15. The pressure roll 36 is rotatably mounted by a suitable means to an idler arm 38, which in turn is pivotally mounted by a mount 39 to the upper frame 15. The pressure is thus applied by the pressure roll 36 to the stock by the weight of the pressure roll 36 and the idler arm 38. The pressure is adjustable by threaded guide stop 40.

The power for the let-off drive of the belt strip is provided by an electrical motor 41. The electric motor 41 drives the supply shafts 33 and 33' by a sprocket 42 and 42' fastened to the motor 41, chains 43 and 43', and sprockets 44 and 44' fastened to supply shafts 33 and 33', respectively.

From the pull roll 35 and pressure roll 36, the belt strip extends downwardly in a festoon around a dancer roll 45 and from there upwardly through guide rolls 52 over a pull roll 54. The guide rolls 52 are rotatably mounted by a mount 53, which is pivotally mounted to the upper frame 15; and the pull roll 54 is rotatably mounted by bearing means 55 to upper frame 15. The dancer roll 45 is rotatably mounted at end portions of the dancer arm 46 which is rigidly mounted on the opposite end portion on shaft 47, which is pivotally mounted through mount 48. The mount 48 is in turn mounted the on upper frame 15. Also rigidly mounted on the shaft 47 with the dancer arm 46 is a sprocket 49, which is attached by a chain 50 to a potentiometer 51. The potentiometer 51 is electrically connected to and controls the power input to the electric gear motor 41 which drives the belt strip let-off. Angular movement of the dancer arm 46 is multiplied typically 6 times to potentiometer 51 by virtue of the size of the sprocket 49 so that let-off of the belt strip is closely controlled. As a result, the festoon required is relatively small and the stretch of the strip which occurs in large festoons is substantially reduced, if not eliminated. From the pull roll 54, the belt strip extends transversely of transfer rolls 56 to the belt guide means 26. The transfer rolls 56 are rotatably mounted by the support 57 to the upper frame 15.

The belt guide means 26 comprises a pull roll 58, guide rolls 60 and a pull roll 61 to transfer and guide the belt strip from the belt support means 25 into the guide means 26. The pull roll 58, guide roll 60 and pull roll 61 are rotatably mounted on the upper frame 15 by a bearing means 58a, a pivot mount 60a and a bearing means 61a, respectively. Also mounted on the shafts of the pull rolls 58 and 61 are air clutches 59 and 62, respectively, through which the pull rolls may be braked as hereinafter described.

The belt strip extends from the pull roll 61 downwardly over a belt guide roll 63, interweaves between the guide roll 63 and another belt guide roll 65 and under the guide roll 65 for precision application over the building drum 10 relative to and preferably substantially symmetrically about the circumferential centerline thereof. The guide rolls 63 and 65 are rotatably mounted by bearing means 64 and 66, respectively, to a movable frame 83.

An air motor 67 is suitably mounted to the upper frame 15 to provide impending motion to reduce to a virtually negligible amount, the friction force and inertia to be overcome by the drive means, hereinafter described, for driving the belt guide means 26. The air motor 67 has a drive sprocket that engages an endless chain 68. The chain 68 is reeved over a sprocket 69 rigidly fastened with the air clutch 62 to the shaft of the pull roll 61; a sprocket 70 rigidly fastened to the shaft of the belt guide roll 63, a sprocket 71 rotatably fastened on the movable frame 83, a sprocket 72 rotatably fastened on a fixed rail support 80, a sprocket 73 rotatably fastened on the stationary frame 77, and a sprocket 74 rigidly fastened with air clutch 59 to the shaft of the pull roll 58.

The grooved guide rolls 63 and 65 of the belt guide means 26 are slidably mounted to move radially of the building drum 10 from a retracted position to an extended, application position where the belt strip is applied over the building drum 10. To accomplish this movement, an air cylinder 75 is pivotally mounted by a support 76 to a stationary frame 77, which is in turn rigidly mounted on the middle frame 14. Ball bushings 78 are rigidly mounted to the movable frame 83, and are slidably fastened to spaced parallel, rails 79, that are rigidly mounted by supports 76 and 82 to the stationary frame 77. The piston rod 81 of the air cylinder 75 is pivotally mounted by a pivot mount 82 to the movable frame 83 to complete the slide assembly for extension and retraction of the belt guide rolls 63 and 65.

The guide rolls 63 and 65 are driven during application of the belt strip over the building drum 10 at substantially the same surface speed as the building drum 10 by a first drive ring 84 and a second drive ring 85. The first drive ring 84 is rigidly fastened to the shaft of guide roll 65. The guide rolls 63 and 65, in turn, frictionally engage each other at their periphery portions. The second drive ring 85 is rigidly fastened to the building drum 10 axially thereof. The first drive ring 84 frictionally engages the second drive ring 85 when the guide rolls 63 and 65 are in an extended position for application of the belt strip over the building drum. Therefore, the belt guide rolls 63 and 65 are driven by and rotate with the building drum 10 by frictional engagement between the drive rings. The ratio of the diameter of the first drive ring 84 to the diameter of the second drive ring 85 is substantially equal to the ratio of the diameter of the belt guide roll 65 at the grooved portions thereof to the building drum 10 so that the belt strip is applied over the building drum at substantially the same surface velocity as the surface velocity of the building drum. Further, it should be noted that the second drive ring 85 is readily changeable or adjustable in diameter to compensate for changes in diameter of the building drum 10 with different sizes of tires or otherwise so that the belt strip is applied over the building drum 10 always at substantially the same velocity as the surface velocity of the rotating drum.

As is seen, the belt applicator 11 accelerates and decelerates during belt strip application. These changes in velocity of the belt strip are related to control the let-off drive of support means 25 by the angular position of the dancer arm 46, which mechanically controls the potentiometer 51. The potentiometer 51 in turn electrically controls the electrical input to the electrical gear motor 41 and thereby controls the let-off drive. In this connection, a safety device is provided on the let-off drive by light sources 86 and 86' and photocells 87 and 87' which are positioned to record the length of the belt strip festoons over dancer rolls 45 and 45', respectively, and photocells 87 and 87' are electrically connected to the electric gear motor 41 so that when the light beam from light source 86 is broken by the festoon of the belt strip on either support means 25 and 25', the let-off drive is stopped.

In operation, the belt applicator 11 is moved along the rails 18 and 19 axially of building drum 10 by actuation of an air cylinder 88. An adjustable cushion stop 91 mounted on the main frame 13 adjacent the rail 18 provides for a cushioned stop of the axial movement of the belt applicator 11 precisely at the index point for precision alignment with and application to the building drum. The stop 91 provides for positive indexing of the belt applicator because an air cylinder 88 continues to urge the applicator against the stop. A limit switch 89 with an actuator 90 is also rigidly mounted on the main frame 13 adjacent the rail 18 to provide for sensing and indexing of the axial movement of the belt support means 25 and belt guide means 26 respectively, relative to and preferably substantially symmetrically of the circumferential centerline of the building drum 10. The limit switch 89 is so positioned that the actuator arm 90 is actuated by a suitable protrusion on frame 14 to provide an electrical signal to the system.

Thereafter, the air cylinder 75 is actuated manually or automatically to cause movement of the belt guide rolls 63 and 65 radially of the building drum 10 from the retracted position to the extended application position. As the guide rolls 63 and 65 extend, the air clutch 62 is actuated to brake the chain 68 so that the sprocket 70 turns the guide rolls 63 and 65 in their reverse direction so that the belt strip is not pulled but rather the belt guide rolls "roll" to the tail of the belt strip. It should be noted in this connection that the grooves 92 in the guide rolls 63 and 65 extend precisely the width of the belt strip to provide for precision guiding of the belt strip onto and over the building drum. An adjustable cushion stop 95 is also mounted on the support 80 of stationary frame 77 to provide for stopping of the extending movement of the guide rolls at the precise point of frictional-drive engagement between the first drive ring 84 and the second drive ring 85. A limit switch 93 with an actuator arm 94 is also mounted on the stationary frame 77 of the guide means 26 to sense for the control system, the extension of the belt strip when the actuator arm 94 contacts a designed protuberance on the movable frame 83.

After spotting of the tail of the belt strip on the building drum 10, the building drum 10 is actuated and rotates one revolution, applying the belt strip over the building drum by driving belt guide rolls 63 and 65 through the first and second drive rings 84 and 85. The belt strip is then cut by an operator, the end on the strip manually stitched over the drum to complete the belt assembly, and the new tail appropriately positioned adjacent guide roll 65 by a magnet or other suitable means.

The belt guide rolls 63 and 65 are then retracted by actuation of the air cylinder 75. During retraction, the air clutch 59 is actuated to brake the chain 68 so that the sprocket 70 turns the guide rolls 63 and 65 in their forward direction so that the tail of the belt strip remains in place and does not retract with the belt guide rolls 63 and 65. The upper adjustable cushion stop 96 provides for stoppage of the belt guide rolls in the retracted position, with the air cylinder 75 continuing to urge the movable assembly against the stop. The upper limit switch 97 with the actuator arm 97A is also mounted on the stationary frame 77 so that the arm 97A is tripped by a protrusion to sense the retraction for the control system. The air cylinder 88 is then actuated to move the belt applicator 11 along the rails 18 and 19 axially of the building drum to index the support and guide means 25' and 26'.

The adjustable cushion stop 91' mounted on the main frame 13 adjacent the rail 18 provides for a cushioned stop of the axial movement so that the support and guide means 25' and 26' are precision positioned relative to and substantially symmetrically of the circumferential centerline of the building drum 10. A second limit switch 98' with an actuator arm 90' is also mounted on the main frame 13 adjacent the rail 18 to sense the precision alignment of the support and guide means 25' and 26' with the building drum 10 for the control system. The limit switch 89' is so positioned that the actuator arm 90' is actuated by a protuberance on the frame 14 at or just prior to the alignment position.

The air cylinder 75' is then actuated manually or automatically to cause extension of the belt guide rolls 63' and 65' from the retracted position to the extended, application position as previously described in connection with the extension of the belt guide rolls 63 and 65. Thereafter the sequence of operation in application of the belt strip from the support and guides means 25' and 26' is precisely the same as previously described in connection with the belt support means 25 and belt guide means 26. Subsequent to the application of the belt strip over the building drum 10, the belt applicator 11 is again axially indexed for precision application of the belt strip from the support and guide means 25 and 26 onto the building drum in the fabrication of the next pneumatic tire.

Figure 6:
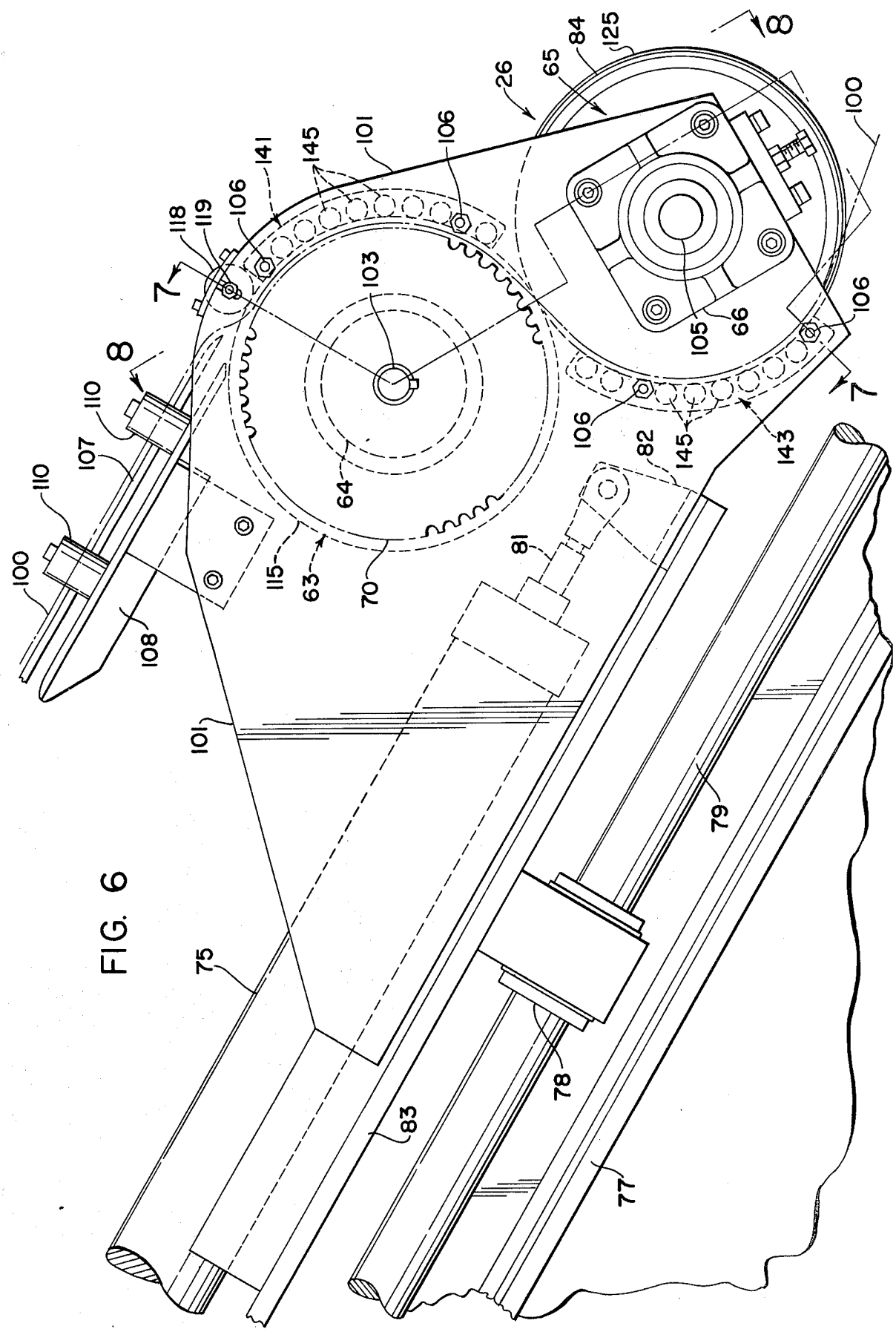
FIG. 6 is a fragmentary side elevation on an enlarged scale illustrating the belt guide assembly of the invention.
Figure 7:
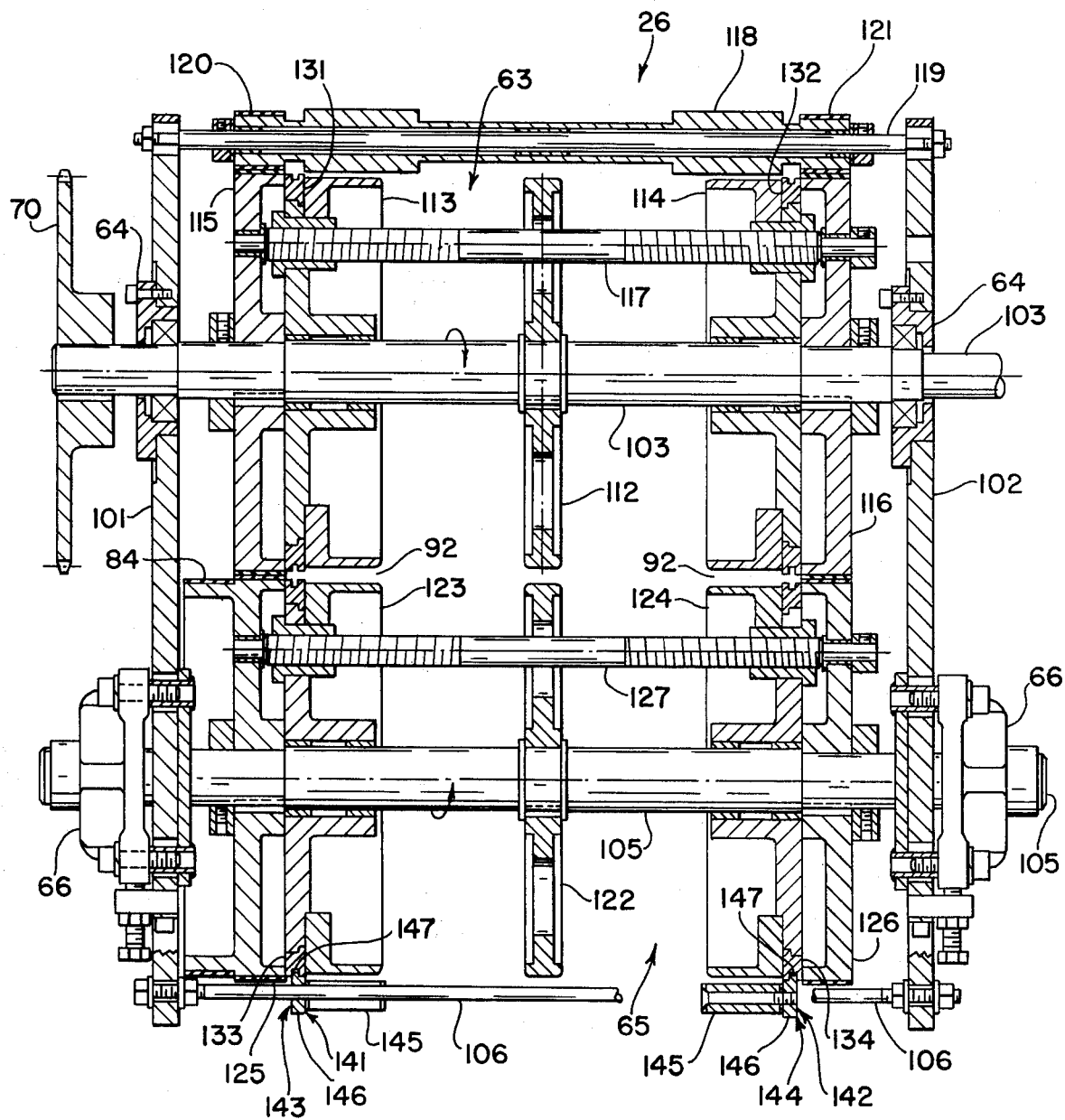
FIG. 7 is a sectional view taken on the line 7—7 of FIG. 6.
Figure 8:
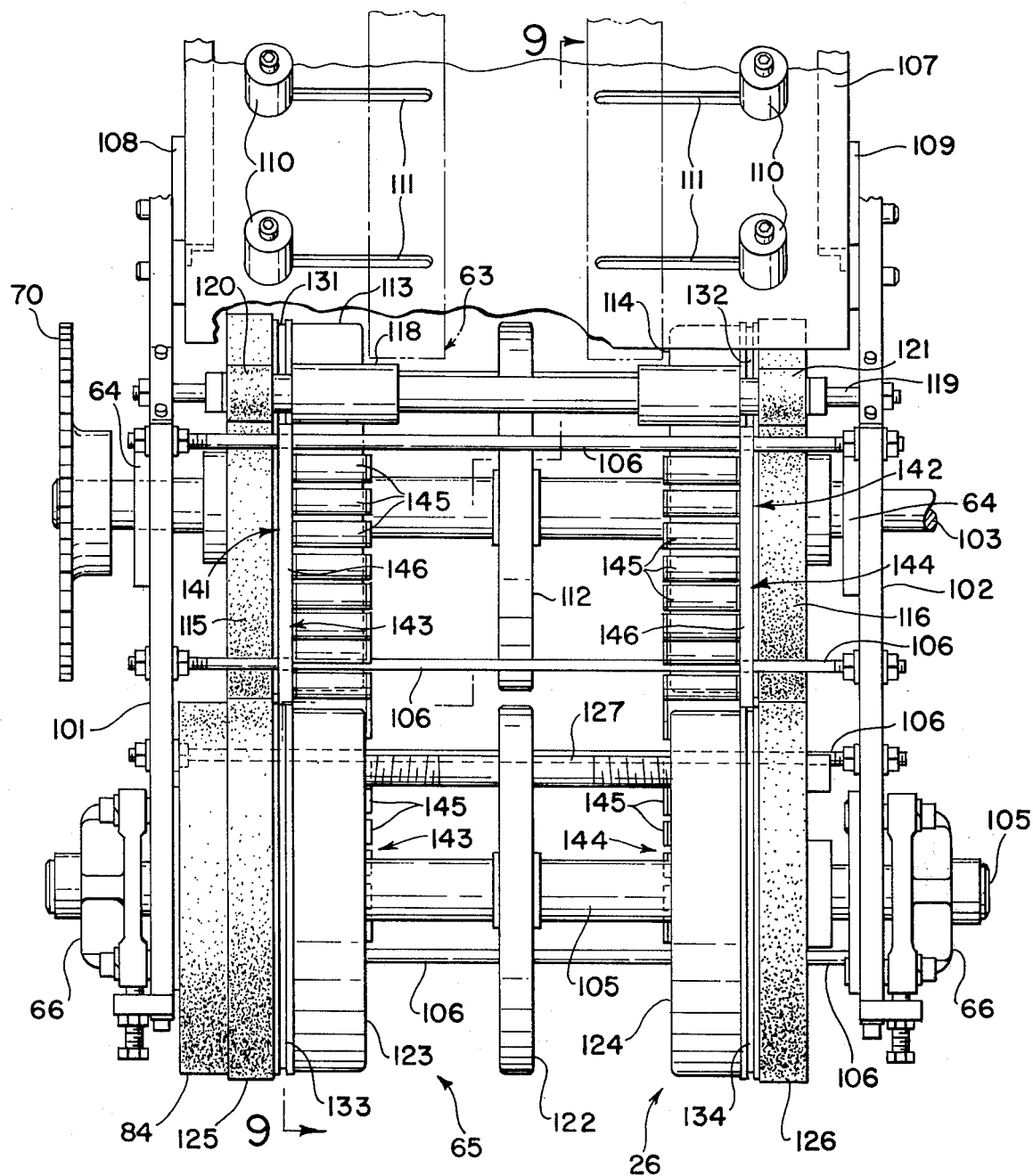
FIG. 8 is a sectional view with parts broken away for the purpose of illustration, taken on the line 8—8 of FIG. 6.

The belt guide means 26 embodying the invention is best illustrated in FIGS. 6 through 9 which show the path of travel of a belt strip indicated by the numeral 100, interweaving between the belt guide rolls 63 and 65, as well as the application of the belt strip 100 to the building drum 10 and the mechanisms for adjusting the belt guide means 26 to match the particular width dimension of the belt strip to be applied. Mounted on the movable frame 83 are a pair of spaced parallel side plates 101 and 102 which serve as mounting brackets for the shafts 103 and 105 for the belt guide rolls 63 and 65, respectively. The plates are interconnected to one another by tie rods 106 (FIGS. 6, 7 and 8). The belt strip 100 is fed to the guide roll 63 along a supply tray 107 attached by brackets 108 and 109 to the side plates 101 and 102.

A number of laterally adjusted upright edge guide rollers 110 are located at the sides of the supply tray 107 to engage and guide the edges of the belt strip 100 and to keep it properly positioned prior to its interweaving between the belt guide rolls 63 and 65. The edge guide rollers 110 are adjustably located in slots 111 for lateral adjustment to accommodate different belt widths.

The belt guide roll 63 comprises a fixed center roll member 112 and two adjustable roll members 113 and 114. The roll members 113 and 114 are adjustable axially toward and away from one another to accommodate different belt strip widths. Accordingly, portions of the belt strip 100 will be unsupported during its interweaving passage between the belt guide rolls 63 and 65. Located on the shaft 103 outwardly of each of the adjustable roll members 113 and 114 are two roll drive rings 115 and 116, respectively, which engage cooperating drive rings of the guide roll 65. The drive rings 115 and 116 are fixed to the shaft 103 by set screws (FIG. 7).

The drive rings 115 and 116, adjustable roll members 113 and 114 and fixed center roll member are interconnected by means of an adjusting rod 117 which has oppositely threaded portions at its opposite ends that engage internal threads in bushings anchored in the adjustable roll members 113 and 114. Also, the adjusting rod 117 is pivotally supported in bushings in the drive rings 115 and 116. Accordingly, by turning the rod 117 the adjustable roll members 113 and 114 may be moved toward and away from one another to a desired spacing corresponding to the width dimension of the belt strip 100.

A locating roll 118 cooperating with the guide roll 63 is located adjacent the supply tray 107, the roll 118 being rotatably mounted on a fixed shaft 119 supported between the side plates 101 and 102. The shaft 119 has a pair of drive rings 120 and 122 engaging and cooperating with the drive rings 115 and 116 of the guide roll 63.

The belt guide roll 65 has a construction similar to that of the guide roll 63 described above and comprises a fixed center roll member 122 and a pair of adjustable roll members 123 and 124 all mounted on the shaft 105. Two drive rings 125 and 126 are located axially outwardly of the adjustable roll members 123 and 124 and are adapted for driving engagement with the drive rings 115 and 116 of the belt guide roll assembly 63. The drive ring 125 is integral with the drive ring 84 that engages the drive ring 83 on the building drum so that both belt guide rolls 63 and 65 are driven at a proper speed in relation to the surface speed of the building drum 10 as the belt strip 100 interweaves around the particular surface portions of the rolls 63 and 65.

At the outer portions of each of the adjustable roll members 113, 114 and 123 and 124 are grooved edge guide rings 131, 132, 133 and 134, respectively with a diameter slightly greater than the diameter of the roll members so that they provide an edge guide means to accurately position the belt strip 100. The rings 131, 132, 133 and 134 define the side edges of the space through which the belt is interweaved between the guide rolls 63 and 64.

Figure 9:
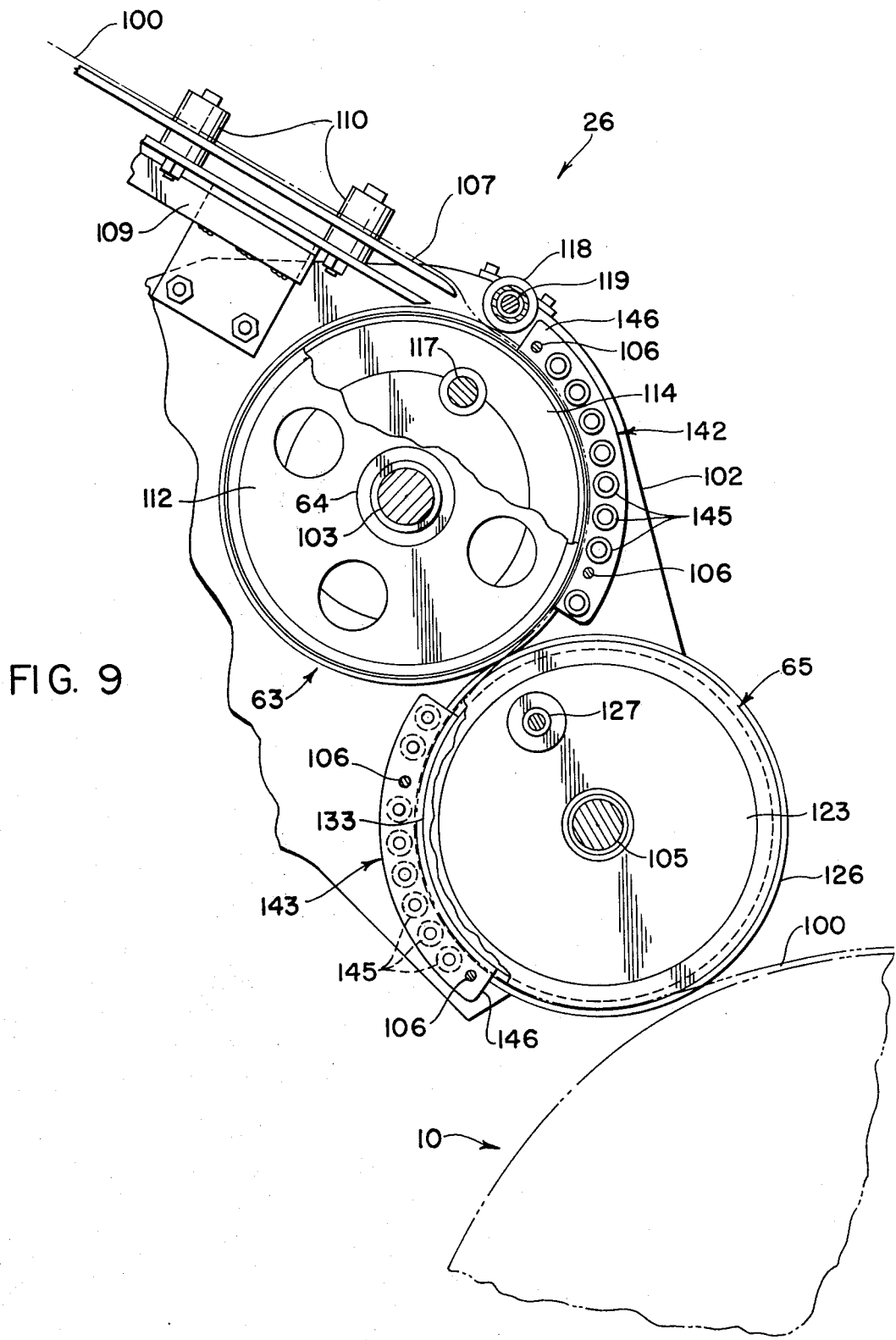
FIG. 9 is a sectional view taken on the line 9—9 of FIG. 9.

In order to facilitate initial interweaving of the belt strip 100 through the "S" shaped path of travel around and between the guide rolls 63 and 65, four threading cage assemblies 141, 142, 143 and 144 are provided as best illustrated in FIGS. 8 and 9. Each of the threading cage assemblies 141, 142, 143 and 144 includes a curved mounting plate 146 with circular openings formed therein adapted to receive the connecting rods 106 and to slide laterally thereon.

The plates 146 have a curved key portion on the inner edge thereof adapted to engage in the respective annular grooves of the edge guide rings 131, 132, 133 and 134. Accordingly, the plates are movable in an axial direction for positioning in close correspondence to the adjustment of the adjustable roll members 113, 114, 123 and 124.

A plurality of inwardly extending roller pins 145 are pivotally mounted on the plates 146 so as to engage and envelope the marginal edge portions of the belt strip 100 to be interwoven around and between the guide rolls 63 and 64. The threading cages 141, 142, 143 and 144 permit the leading edge of a belt strip to be initially introduced between the roll 63 and its associated locating roll 118 after which the belt strip is automatically fed through its "S" shaped path of travel between and around the guide rolls 63 and 65 as defined and retained by the threading cages 141, 142, 143 and 144.

While the invention has been shown and described with reference to a specific embodiment thereof this is intended for the purpose of illustration rather than limitation and other modifications and variations of the specific device herein shown and described will be apprarent to those skilled in the art all within the intended spirit and scope of the invention. Accordingly, the patent is not to be limited in scope and effect in any way that is inconsistent with the extent to which the progress in the art has been advanced by the invention.

We claim as our invention:

1. Service apparatus for applying belt strips onto a rotatable tire building drum comprising:

belt guide means having at least one belt guide roll for guiding a belt strip over the building drum in precision alignment relative to the circumferential centerline of the building drum, said belt guide roll defining a belt strip receiving groove with a width corresponding to the width of said belt strip, said belt strip being wrapped around a portion of said belt guide roll in said groove; and a first drive ring coaxial with and fastened to rotate with a belt guide roll of said guide means, and a second drive ring coaxial with and fastened to rotate with said building drum and engage said first drive ring in frictional rolling engagement with circumferential portions of said first drive ring, said first and second drive rings being selectively engageable and having a ratio of diameters substantially equal to a ratio of diameters of said guide roll and said building drum, whereby said belt guide roll is driven by rotation of the building drum at substantially the same surface velocity as the surface velocity of said building drum during application of said belt strip.

2. Apparatus as defined in claim 1 comprising in addition:

means for automatically retracting said belt guide means from an application position to a retracted position for storage between belt strip application over said building drum.

3. Apparatus as defined in claim 1 wherein:

said belt guide means includes at least two belt guide rolls for interweaving the belt strip prior to application to the building drum, each said guide roll defining a groove substantially the width of the belt strip.

4. Apparatus as defined in claim 1 wherein:

two belt guide means are provided adjacent one another and are slidably mounted to move axially of the building drum such that the belt support means and belt guide means can be sequentially indexed for precision application of successive belt strips to the building drum from the respective belt guide means.

5. Service apparatus for applying belt strips onto a rotatable tire building drum comprising:

belt guide means having at least one belt guide roll for guiding a belt strip over the building drum in precision alignment relative to the circumferential centerline of the building drum, said belt guide roll including two axially spaced roll end members that are axially adjustable toward and away from one another and define sides of a belt strip receiving groove of width corresponding to the width of the belt strip to be applied, and means for axially adjusting said roll end members toward and away from one another to change the width of said belt strip receiving groove to accommodate belt strips of different widths, said belt strip being wrapped around a portion of said belt guide roll in said groove; and a first drive ring axially fastened to rotate with a belt guide roll of said guide means, and a second drive ring axially fastened to rotate with said building drum and engage said first drive ring at circumferential portions thereof, said first and second drive rings being selectively engageable and having a ratio of diameters substantially equal to a ratio of diameters of said guide roll and said building drum, whereby said belt guide roll is driven by rotation of the building drum at substantially the same surface velocity as the surface velocity of said building drum during application of said belt strip.

6. Apparatus as defined in claim 5 wherein said guide roll includes an axially fixed center roll member located between said roll end members.

7. Apparatus as defined in claim 5 wherein said guide roll includes a pair of axially fixed elements located on opposite sides of said guide roll outwardly of the respective roll end member and wherein said roll adjusting means comprises an elongated member parallel to the axis of said guide roll extending through said roll end members and journaled in said axially fixed elements, said elongated member being threadedly received in at least one of said roll end members whereby turning said elongated member adjusts said roll end in an axial direction.

8. Apparatus as defined in claim 5 including means for automatically threading a belt strip into said groove of said guide roll comprising a pair of curved threading cages fixed against rotation relative to said guide roll and overlying the marginal side portions of said groove.

9. Apparatus as defined in claim 8 wherein each of said threading cages comprises a plurality of spaced parallel rollers with their axes parallel to the axis of said guide roll and adapted to engage and guide side portions of said leading end of said belt strip through a curved path of travel defined by said groove.

10. Apparatus as defined in claim 9 including keying means on said threading cages operatively engageable with the respective adjacent roll end member whereby the spacing between said cages is automatically adjusted during axial adjustment of said roll end members to correspond to the width of said belt strip.

* * * * *